United States Patent

Bryden et al.

[11] Patent Number: 5,145,264
[45] Date of Patent: Sep. 8, 1992

[54] BEARINGS

[75] Inventors: Donald J. S. Bryden, Stewarton; Peter T. Work; Hugh Mair, both of Kilmarnock; Roy K. McCulloch, Kilbirnie; Hugh M. Ross, Kilmarnock, all of Scotland

[73] Assignee: The Glacier Metal Company Limited, Northwood Hills, England

[21] Appl. No.: 661,183

[22] Filed: Feb. 27, 1991

[30] Foreign Application Priority Data

Mar. 2, 1990 [GB] United Kingdom ............... 9004716

[51] Int. Cl.⁵ .............................................. F16C 17/10
[52] U.S. Cl. ..................................... 384/275; 384/295
[58] Field of Search ............... 384/275, 296, 288, 294, 384/295, 457

[56] References Cited

U.S. PATENT DOCUMENTS 3,795,428  3/1974  Paine et al. .
3,972,576  8/1976  Hill .
4,702,624  10/1987  Fontana .................. 384/294
4,714,356  12/1987  Damour et al. ............ 384/275
4,989,998  2/1991  Willis et al. .............. 384/275

FOREIGN PATENT DOCUMENTS 0195474  9/1986  European Pat. Off. .
0298953  7/1988  European Pat. Off. .

Primary Examiner—Lenard A. Footland
Attorney, Agent, or Firm—William R. Hinds

[57] ABSTRACT

Flanged bearing bushes are described, the bearing bushes comprising a journal bearing element and a thrust flange bearing element on at least one end face of the journal bearing element, the at least one end face of said journal having at least two axially directed recesses adapted to receive generally axially directed tabs formed from thrust flange material and which tabs are fixed in position in the recesses by deformation of journal bearing element material adjacent the axially directed recesses. The flange element may be of generally annular, rectangular or any other polygonal shape.

7 Claims, 3 Drawing Sheets

BEARINGS

The present invention relates to a cylindrical bearing bush having a thrust flange member on at least one axial end of the bush.

Cylindrical bearing bushes are frequently wrapped from flat strip material, the strip material generally comprising a backing, such as steel, and having a lining of a bearing material thereon. Many applications require a bearing having a journal element and a thrust accepting element, usually called a thrust flange. Some lining materials have either insufficient ductility or adhesion to the backing to withstand the formation of an integral thrust flange on the bush end. In these circumstances a separate thrust flange member is frequently employed.

There is a general trend in industry towards reduction of the number of parts to be assembled and towards automatic asembly of parts. In the case of separate journal and thrust flange elements in a bush the problem of automatic assembly is greatly increased.

According to the present invention there is provided a flanged bearing bush, the bearing bush comprising a cylindrical journal bearing and a thrust flange bearing on one end face of the journal bearing, said one end face of the journal bearing having at least two axially directed recesses which receive generally axially directed tabs formed from thrust flange material and having inner surfaces extending generally axially along the bore of the thrust flange, and which tabs are fixed in position in the recesses by deformation of journal bearing material adjacent the axially directed recesses, the outer diameter of the journal bearing being greater than the inner diameter of the bore of the flange bearing and the inner axial surfaces of the tabs.

The flange member may be of generally annular form or of any other desired shape such as non-circular or other polygonal shape for example. A rectangular shaped flange may be beneficial with regard to anti rotation properties where it is desirable for the bearing to have additional resistance to rotation other than merely its interference fit in the co-operating housing.

In one embodiment the generally axially directed tabs are formed by bending of radially directed projections formed in the bore of the flange element. Preferably the generally axially directed tabs have a waisted portion into which material may be deformed to provide retention.

There may be two or more tabs and corresponding recesses formed around the bearing periphery.

The outer diameter of the journal bearing element is greater than the inner diameter or bore of the flange element so that when assembled, the rear face of the flange element is adjacent the end face of the journal bearing element.

In order that the present invention may be more fully understood examples will now be described by way of illustration only with reference to the accompanying drawings, of which:

Figure 9:
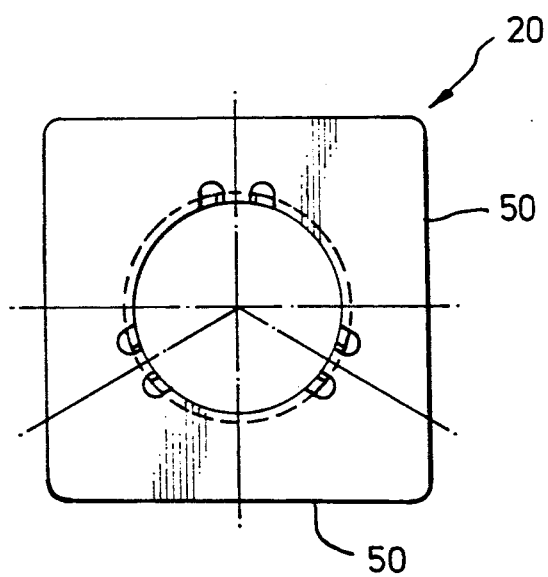
Figure 10:
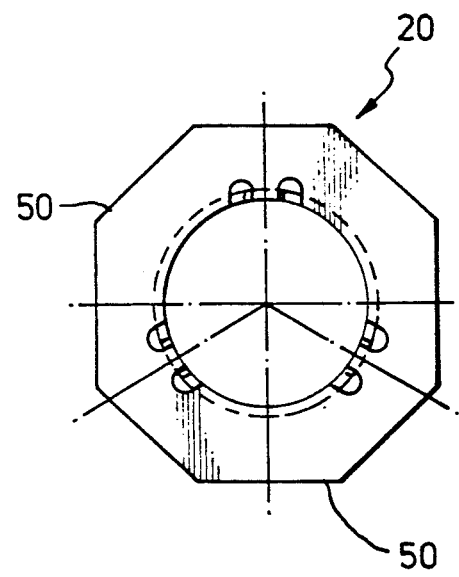

FIGS. 9 and 10 which show examples of alternative shapes of flange members.

Referring now to FIGS. 1 to 8 and where the same features have common reference numerals.

A journal bearing bush is shown generally at 10, the bush having been formed from a flat blank of material (not shown) comprising a steel backing 12 and a bearing material lining 14. After forming, the bush 10 has a split line 16. The end face 18 which receives a thrust flange member 20 has three recesses 22, which may be made in the formed bush 10 or in the initial flat blank. The recesses, in the embodiment shown, are spaced around the end face 18 at intervals of 120°. The flange member 20 is generally annular in form having a bore 24 into which there are three projections 26 also spaced at 120° intervals. The projections 26 of the flat thrust flange are associated with undercut portions 28 lying either side of the projections 26. The projections 26 have a slightly waisted planform 30. The bore diameter 24 is slightly larger than the bore diameter 32 of the journal bush 10. Before assembly of the thrust flange 20 to the bush 10, the projections 26 are bent through a right angle so that they project in an axial direction to form tabs 34.

Figure 1:
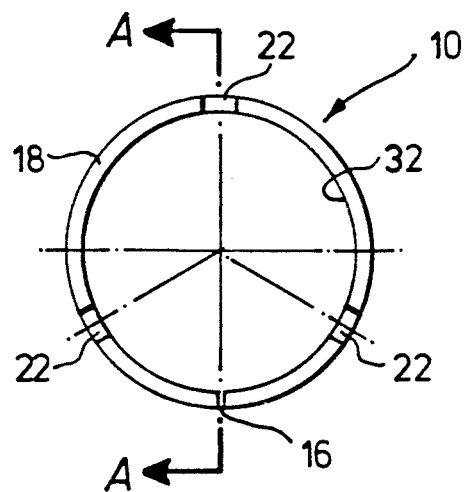
FIG. 1 shows an end elevation of a journal bearing element.
Figure 2:
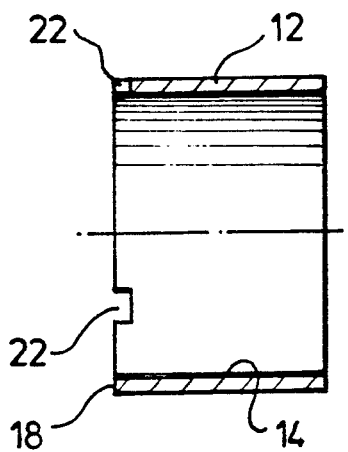
FIG. 2 shows an axial cross section through AA of the journal bearing element of FIG. 1.
Figure 3:
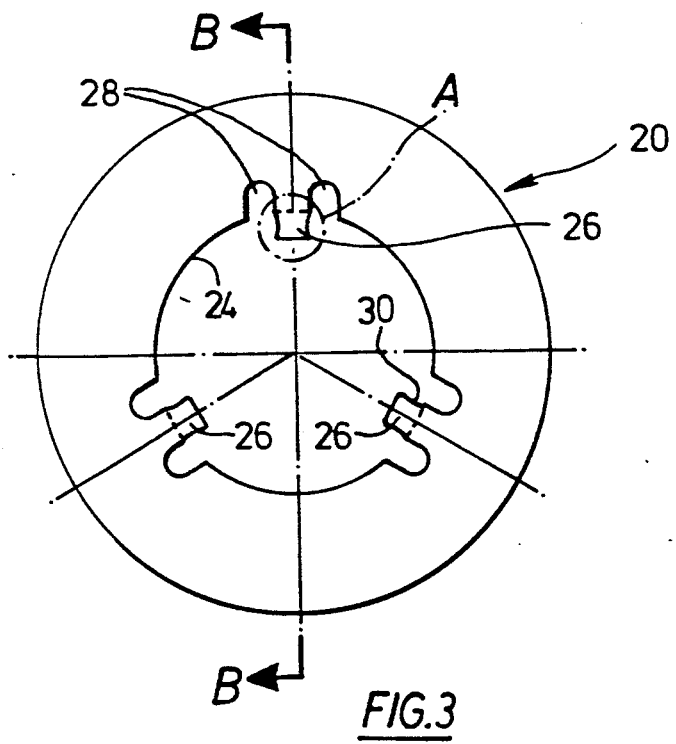
FIG. 3 shows an end elevation of a thrust flange element.
Figure 4:
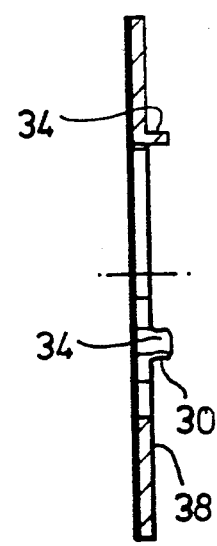
FIG. 4 shows a side elevation of a cross section of the thrust flange of FIG. 3 through the line BB after forming the tabs.
Figure 5:
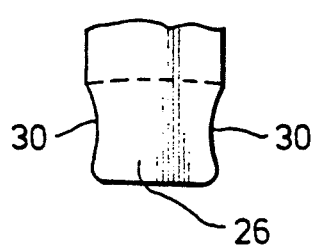
FIG. 5 shows an enlarged view of the detail "A" of FIG. 3.
Figure 6:
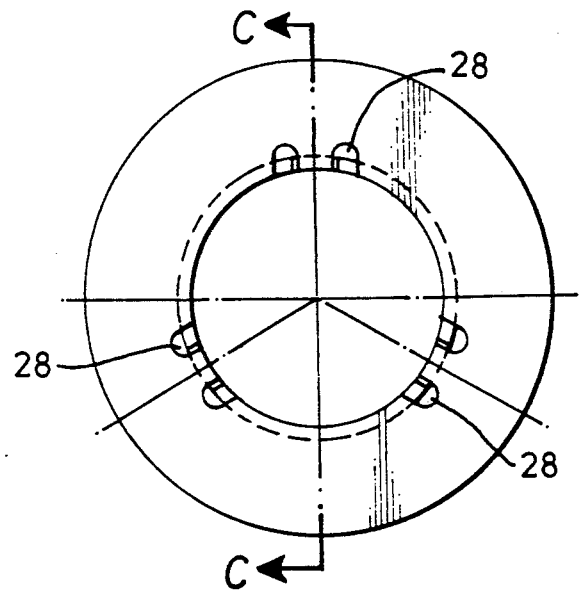
FIG. 6 shows an end elevation of the journal bearing element of FIGS. 1 and 2 and the thrust flange of FIGS. 3 and 4 assembled together.
Figure 7:
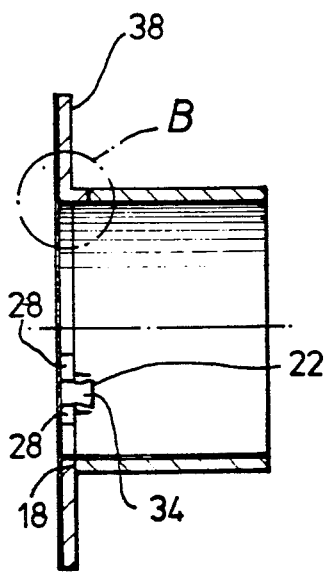
FIG. 7 shows an axial cross section through the line CC of the assembled bearing of FIG. 6.
Figure 8:
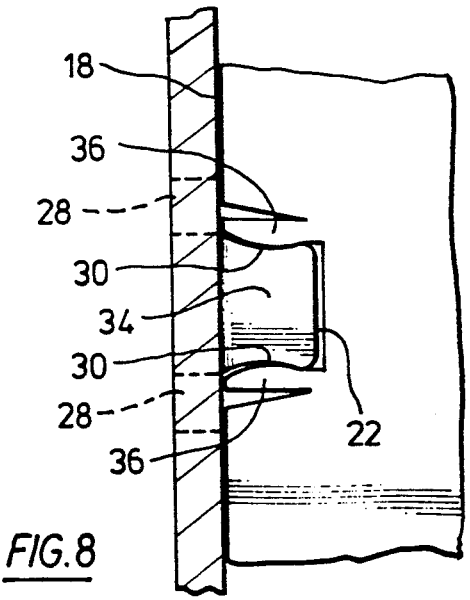
FIG. 8 shows an enlarged plan view of the detail "B" of FIG. 7.

In their axially directed form, the tabs 34 co-operate with the recesses 22 and are held securely in position by staking of the end face material 36 adjacent the tab waisted portion 30, the end face material being deformed into the tab waist (see FIG. 8). This staking operation is carried out by a tool (not shown) which enters axially through the undercut portions 28.

Insertion of the assembled bush into its housing (not shown) is facilitated since the rear face 38 of the thrust flange abuts the end face 18 of the bush 10 thus providing a large area on which an insertion tool (not shown) may locate.

FIGS. 9 and 10 show bearings having rectangular and polygonal, in this instance octagonal, flange members 20 respectively. The flat faces 50 may be used to provide additional security against rotation of the bearing in its housing (not shown).

We claim:

1. A flanged bearing bush, the bearing bush comprising a cylindrical journal bearing and a thrust flange bearing on one end face of the journal bearing, said one end face of said journal bearing having at least two axially directed recesses which receive generally axially directed tabs formed from thrust flange material and having inner surfaces extending generally axially along the bore of said thrust flange, and which tabs are fixed in position in said recesses by deformation of journal bearing material adjacent said axially directed recesses, the outer diameter of said journal bearing being greater than the inner diameter of the bore of said flange bearing and the inner axial surfaces of said tabs.

2. A flanged bearing bush according to claim 1 wherein said generally axially directed tabs are formed by the bending of radially directed projections formed in the bore of the thrust flange.

3. A flanged bearing bush according to claim 1 wherein said flange is generally annular in form.

4. A flanged bearing bush according to claim 1 wherein said flange is polygonal in form.

5. A flanged bearing bush according to claim 1 wherein said generally axially directed tabs have a waisted portion to receive deformed material from said journal bearing.

6. A flanged bearing bush according to claim 1 wherein there are three said generally axially directed tabs.

7. A flanged bearing bush according to claim 1 wherein said thrust flange has undercut portions lying adjacent said tabs and providing openings for axial access of a tool to effect said deformation of journal bearing material adjacent said axially directed recesses.

* * * * *